United States Patent
Bank et al.

(10) Patent No.: US 9,769,181 B2
(45) Date of Patent: Sep. 19, 2017

(54) MOBILE DEVICE STORAGE VOLUME ENCRYPTION WITH GEOGRAPHY CORRELATED KEY MANAGEMENT AND MOUNT OPERATIONS

(71) Applicant: International Business Machines Corporation, Armonk, NY (US)

(72) Inventors: Judith H. Bank, Cary, NC (US); Lisa M. Bradley, Cary, NC (US); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 14/311,575

(22) Filed: Jun. 23, 2014

(65) Prior Publication Data
US 2015/0373030 A1   Dec. 24, 2015

(51) Int. Cl.
H04L 29/06   (2006.01)
H04W 12/08   (2009.01)
H04W 4/02   (2009.01)

(52) U.S. Cl.
CPC ........... *H04L 63/107* (2013.01); *H04W 4/025* (2013.01); *H04W 12/08* (2013.01)

(58) Field of Classification Search
CPC ...... H04L 63/107; H04W 12/08; H04W 4/025
See application file for complete search history.

(56) References Cited

U.S. PATENT DOCUMENTS

| | | | |
|---|---|---|---|
| 8,542,833 B2 | 9/2013 | Devol et al. | |
| 8,856,916 B1* | 10/2014 | Sobel | G06F 21/62 |
| | | | 726/17 |
| 2007/0115097 A1 | 5/2007 | Scott et al. | |
| 2008/0201783 A1* | 8/2008 | Tamai | G06F 21/6209 |
| | | | 726/28 |
| 2012/0188064 A1* | 7/2012 | Mahaffey | H04L 63/1441 |
| | | | 340/384.1 |
| 2012/0317615 A1 | 12/2012 | Geva et al. | |
| 2013/0045753 A1 | 2/2013 | Obermeyer et al. | |
| 2013/0053057 A1 | 2/2013 | Cansino et al. | |
| 2013/0091564 A1* | 4/2013 | Fitzgerald | G06F 21/88 |
| | | | 726/17 |

(Continued)

FOREIGN PATENT DOCUMENTS

| | | |
|---|---|---|
| WO | 2008134414 | 11/2008 |
| WO | 2010068438 | 6/2010 |

*Primary Examiner* — Qun Shen
(74) *Attorney, Agent, or Firm* — Terrile, Cannati, Chambers & Holland, LLP; Stephen A. Terrile

(57) ABSTRACT

A method, system and computer-usable medium are disclosed for protecting data stored on a mobile device, based upon its location. Data stored on a mobile device is encrypted with a network-stored secret key that is unknown to the user of the mobile device. The secret key is provided directly to the mobile device once the user is authenticated and it has been determined that the mobile device is located within a predetermined geographical area. The provided secret key is then used to decrypt the encrypted data stored on the mobile device such that it can then be accessed by the user. The user is then prevented from accessing the encrypted data when it is determined that the mobile device is no longer located within the predetermined geographical area.

17 Claims, 3 Drawing Sheets

(56) References Cited

U.S. PATENT DOCUMENTS

2013/0254537 A1* 9/2013 Bogorad .............. H04L 9/0822
  713/165
2014/0337528 A1* 11/2014 Barton .................. H04L 41/00
  709/225

* cited by examiner

MOBILE DEVICE STORAGE VOLUME ENCRYPTION WITH GEOGRAPHY CORRELATED KEY MANAGEMENT AND MOUNT OPERATIONS

BACKGROUND OF THE INVENTION

Field of the Invention

The present invention relates in general to the field of computers and similar technologies, and in particular to software utilized in this field. Still more particularly, it relates to a method, system and computer-usable medium for protecting data stored on a mobile device, based upon its location.

Description of the Related Art

Protecting confidential data is becoming more difficult as employees bring their own mobile devices into the workplace. This trend, known as "bring your own device" (BYOD), has created new challenges for organizations that not only need to ensure authenticated and secure access to their confidential data, but also protect it once it is stored on an employee-owned device and leaves their premises. One approach to addressing these issues includes either fully or selectively deleting data from the mobile device as the employee leaves a designated area. However, this approach may prove impractical, especially if the user intends to bring their mobile device back to the area. If so, they may need to reload a large amount of data that has previously been deleted.

Furthermore, simply deleting the data may be insufficient. As a result, additional time will likely be needed to fully wipe the data from the mobile device by overwriting the storage area that was used to store the data. Likewise, the user may be in transit between two allowable locations, and wiping confidential data from the mobile device for the time it is in transit may not be realistic. Another common approach is the use of encryption and a user passcode or key. While this approach protects the data if the mobile device is lost or stolen in transit, it does not prevent unauthorized use of the data by an employee.

Other known approaches to these issues include implementing physical locks in combination with Global Position System (GPS) and time information. In this approach, the mobile device is unlocked when it is within a predetermined geofenced area and time interval. Another approach is the implementation of a geofence-based security beacon that allows a user to use their mobile device only when they are within the coverage area of the security beacon. Yet another approach provides notification to an operating system, or a subsystem, when a device enters or leaves a predetermined geofenced area within a specified time interval. However, none of these approaches secures data and makes it inaccessible when a mobile device leaves a predetermined geofenced area.

SUMMARY OF THE INVENTION

A method, system and computer-usable medium are disclosed for protecting data stored on a mobile device, based upon its location. In various embodiments, a user is provided access to protected data stored in a mobile device when it is determined to be located within a predetermined geographical area, such as a geofence. In these embodiments, the user is then prevented from accessing the protected data when it is determined that the mobile device is no longer located within the predetermined geographical area.

In various embodiments, the data is encrypted with a secret key that is unknown to the user. In these embodiments, the secret key is provided directly to the mobile device once the user is authenticated and it has been determined that the mobile device is located within the predetermined geographical area. The provided secret key is then used to decrypt the protected data stored on the mobile device such that it can then be accessed by the user. In various embodiments, the secret key is not stored in the mobile device. In certain embodiments, the secret key is discarded once the protected data stored in the mobile device has been accessed by the user. In various embodiments, processes holding open files associated with the protected data are terminated if it is detected that the mobile device is no longer within the geographical area.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
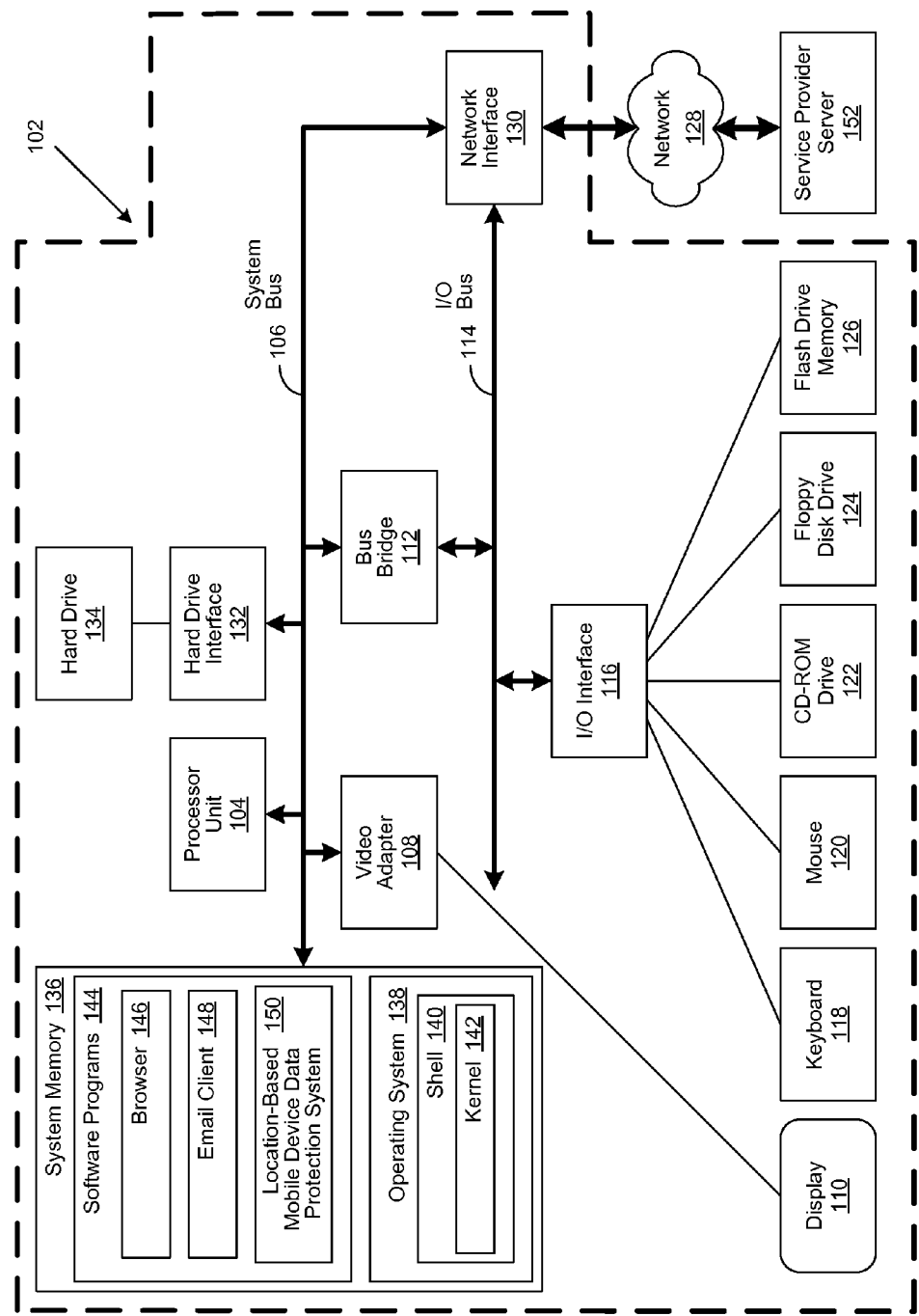
FIG. 1 depicts an exemplary client computer in which the present invention may be implemented.

A method, system and computer-usable medium are disclosed for protecting data stored on a mobile device, based upon its location. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a location-based mobile device data protection system 150. In these and other embodiments, the location-based mobile device data protection system 150 includes code for implementing the processes described hereinbelow. In one embodiment, client computer 102 is able to download the location-based mobile device data protection system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
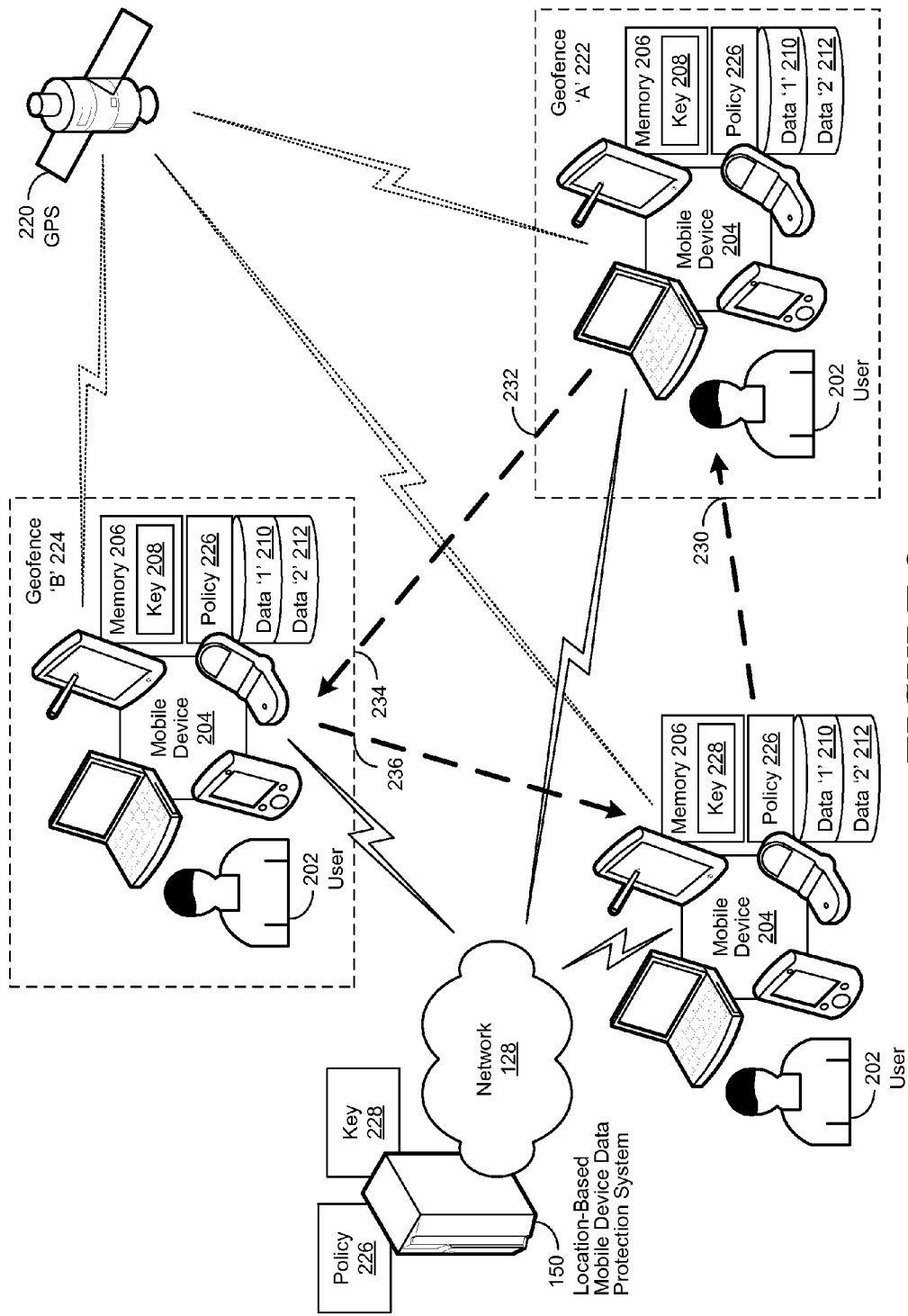
FIG. 2 is a simplified block diagram of a location-based mobile device data protection system.

FIG. 2 is a simplified block diagram of a location-based mobile device data protection system implemented in accordance with an embodiment of the invention. Those of skill in the art will be aware that it is becoming increasing common to allow a user 202 to bring their personal mobile device 204 to the workplace and use it for business purposes in addition to personal purposes. This trend of "bring your own device" (BYOD) often comes with the requirement that the user 202 install a security policy 226 on their mobile device 204 in order to maintain control over business or other confidential data. Such security policies are typically generated and managed through the use of various mobile device management (MDM) systems familiar to skilled practitioners of the art.

In various embodiments, the security policy 226 is generated and managed by a location-based mobile device data protection system 150. In these embodiments, the security policy 226 is implemented to protect confidential data, such as protected data (e.g., data stores '1' 210 and '2' 212) stored in a mobile device 204 while outside a predetermined geographic area (e.g., geofence 'A' 222 or 'B' 224). In these various embodiments, the location-based mobile device data protection system 150 and the mobile device 204 are communicatively coupled by a network 128. In various embodiments, the user 202 of the mobile device 204 is not allowed to have root access. Instead, the user 202 executes in a non-privileged account with reduced access to system calls. In certain embodiments, the location-based mobile device data protection system 150 runs as root. In these embodiments, the location-based mobile device data protection system 150 is a privileged user of the mobile device 204 for the purpose of providing and using of one or more secret keys 228 to allow access to, and use of, the data stores '1' 210 and '2' 212.

Referring now to FIG. 2, location-based mobile device data protection operations are begun in various embodiments by performing location monitoring operations to monitor the location of a target mobile device 204. In various embodiments, Global Positioning System (GPS) 220 approaches familiar to those of skill in the art are used in the performance of the location monitoring operations. In certain embodiments, the location of the mobile device 204 is monitored by the location of its access to a network, such as network 128. In various embodiments, location data is provided by the mobile device 204 and validated by a combination of GPS 220 coordinates and network 128 access locations.

In these embodiments, a determination is then made whether the mobile device 204 has entered a predetermined geofence, such as geofence 'A' 222 or 'B' 224. As used herein, a geofence broadly refers to a virtual perimeter of a physical geographical area. In various embodiments, the geofence may be dynamically generated, such as a predetermined radius around a corporate location. In certain embodiments, the geofence may be a predefined set of boundaries, such as a corporate campus, an individual building, or a portion of a building. In these embodiments, such geofences allow approved zones to be defined for predetermined places of work and other secure areas where access to, and use of, protected data stores (e.g., data stores '1' 210 and '2' 212) is allowed. In certain embodiments, the geofence (e.g., geofence 'A' 222 or 'B' 224) is defined through the use of predetermined borders, such as an office space with borders established by positioning technology attached to a specially programmed server. As a result, the office space becomes an authorized location for designated users 202 and mobile devices 204.

In various embodiments, a location-based service (LBS) is implemented with a mobile device 204 to make it aware of its current location. Skilled practitioners of the art will be familiar with LBS, which generally refers to a class of services that use location data to control features on a mobile device. In various embodiments, the LBS is an information service that is accessible by the mobile device 204 through a mobile network, such as network 128, that uses information related to the geographical position (e.g., within geofence 'A' 222 or 'B' 224) of the mobile device 204. In these embodiments, the LBS includes services to identify the location of a user 202 of a mobile device 204.

In certain embodiments, the user 202 of the location-aware mobile device 204 receives a notification when the mobile device 204 enters or exits a predetermined geofence, such as when respectively entering 230, 234 or exiting 232, 236 geofence 'A' 222 or 'B' 224. In certain embodiments, the geofence notification may contain information about the location of the mobile device 204, or protected data stores (e.g., data stores '1' 210 and '2' 212) that may be available to the user 202 when the mobile device 204 is within a predetermined geofence (e.g., geofence 'A' 222 or 'B' 224). As used herein, a data store broadly refers to a data repository of a set of data objects. In various embodiments, such data stores may include structured, unstructured, semi-structured, relational, object-oriented, flat file databases, or any combination thereof. In certain embodiments, such data stores may likewise include individual files or data elements. In various embodiments, such data stores may be contained in physical or logical volumes familiar to those of skill in the art. These same skilled practitioners of the art will recognize that many such examples and embodiments are possible and the foregoing is not intended to limit the spirit, scope or intent of the invention.

In one embodiment, the geofence notification is sent to a location-based mobile device data protection system 150, described in greater detail herein. In this embodiment, the geofence notification is processed by the location-based mobile device data protection system 150 to generate a notification of available protected data stores, such as data store '1' 210 and data store '2' 212. In turn, the notification is provided to the mobile device 204.

The user 202 of the mobile device 204 is then prompted to provide login credentials familiar to those of skill in the art. As used herein, login credentials broadly refer to a set of challenge/response information that is used in various authentication protocols. In various embodiments, the login credentials may include a username, a password, or an intranet identifier (ID). In certain embodiments, other forms of login credentials may include various forms of challenge/response information, Public Key Infrastructure (PKI) certificates, smartcards, biometrics, and so forth.

Once they are provided, the login credentials are then processed to authenticate the user 202 of the mobile device 204. As used herein, authentication broadly refers to the process of validating a set of credentials that are provided by a user 202 or on behalf of a user 202. In various embodiments, authentication of the user 202 is accomplished by verifying something that the user 202 knows, something that the user 202 has, or something that the user 202 is, such as some physical characteristic about the user 202. Something that the user 202 knows may include a shared secret, such as the user's 202 password, or by verifying something that is known only to a particular user 202, such as the user's 202 cryptographic key. Something that the user 202 has may include a smartcard or hardware token. Some physical characteristic about the user 202 might include a biometric input, such as a fingerprint or a retinal map. In various embodiments, the user 202 is a natural person. In certain embodiments, the user 202 may be a machine, computing device, or other type of data processing system that uses a computational resource. In various embodiments, the user may possess either a single, or multiple, unique identifiers.

In certain embodiments, various mobile device 204 location information is processed to determine the user's 202 authorization to access protected data stored in predetermined data stores (e.g., data stores '1' 210 and '2' 212). As used herein, authorization broadly refers to the function of specifying access rights to resources, such as such as protected data stored in data stores '1' 210 and '2' 212. In various embodiments, authorization operations are performed to define a security policy 226 that specifies under what conditions, or within which parameters, access to protected data is authorized. The resulting security policy 226 is then used to control access to a predetermined resource, such as protected data stored in data stores '1' 210 and '2' 212.

One known approach to managing such authorizations is through the implementation of an authorization engine, such as the Tivoli® Security Policy Manager (TSPM), available from International Business Machines (IBM®) of Armonk, N.Y. Such authorization engines typically use parameters from a request, such as location information associated with a target mobile device 204, as input to a policy decision point (PDP). In turn, the PDP references predetermined rules to decide whether a given request, such as access to such as protected data stored in data stores '1' 210 and '2' 212, will be permitted or denied.

In one embodiment, the user 202 is authorized to access the same data store (e.g., data store '1' 210) from within either a first geofence (e.g., geofence 'A' 222) or a second geofence (e.g., geofence 'B' 224). In another embodiment, the user 202 is only authorized to access a first data store (e.g., data store '1' 210) from within a first geofence (e.g., geofence 'A' 222) and a second data store (e.g., data store '2' 212) from within a second geofence (e.g., geofence 'B' 224). In this embodiment, the user 202 is not authorized to access the second data store (e.g., data store '2' 212) from within the first geofence (e.g., data store '1' 210). Likewise, the user 202 is not authorized to access the first data store (e.g., data store '1' 210) from within the second geofence (e.g., geofence 'B' 224). Skilled practitioners of the art will realize that many such embodiments are possible and the foregoing is not intended to limit the spirit, scope or intent of the invention.

Once the user's 202 authorization to access predetermined data stores (e.g., data stores '1' 210 and '2' 212) has been determined, one or more secret keys 228 are provided to the mobile device 204. In various embodiments, the one or more secret keys 228 are provided to the mobile device 204 by a location-based mobile device data protection system 150. In these and other embodiments, the one or more secret keys 228 are then used to unlock and access encrypted data stores (e.g., data stores '1' 210 or '2' 212) corresponding to the user's authorization within their current geofence location (e.g., geofence 'A' 222 or 'B' 224). In certain embodiments, the one or more secret keys 228 were previously used to encrypt predetermined data stored on the mobile device 204 (e.g., data stores '1' 210 or '2' 212). In various embodiments, the encryption of the predetermined data was performed by the location-based mobile device data protection system 150. The method by which the predetermined data is encrypted is a matter of design choice.

In various embodiments, the one or more secret keys 228 are specific to the mobile device 204 used by the user 202 to provide their login credentials. In certain embodiments, a secret key 228 is specific to the user's 202 mobile device 204 and one or more predetermined data stores (e.g., data stores '1' 210 and '2' 212). In various embodiments, the one or more secret keys 228 are generated at the time the mobile device 204 is registered with a predetermined location-based mobile device data protection system 150. In certain embodiments, the one or more secret keys 228 are generated at the time the user 202 is granted access to an additional data store. In these embodiments, the method by which the one or more secret keys 228 are generated, and the method by which the mobile device 204 is registered with the predetermined location-based mobile device data protection system 150 is a matter of design choice.

In various embodiments, the one or more secret keys 228 are generated by the predetermined location-based mobile device data protection system 150. In certain embodiments, the one or more secret keys 228 are generated by a predetermined cryptographic key generation system familiar to those of skill in the art. In these embodiments, the one or more secret keys 228 are provided to the predetermined location-based mobile device data protection system 150 by the predetermined cryptographic key generation system.

In various embodiments, the one or more secret keys 228 may be a symmetric key, likewise familiar to those of skill in the art. In certain embodiments, the one or more secret keys 228 may be encrypted with a key encryption key (KEK), a traffic encryption key (TEK), or a combination of the two, prior to being provided to the mobile device 204. In these embodiments, the KEK, TEK, or both, further protects the one or more secret keys 228 prior to being used by the mobile device 204 to decrypt the protected data store (e.g., data stores '1' 210 or '2' 212).

In certain embodiments, the one or more secret keys 228 are neither generated by, nor locally stored on, the mobile device 204. In these embodiments, the user 202 has no knowledge of, nor access to, the one or more secret keys 228. In various embodiments, the predetermined location-based mobile device data protection system 150 provides the one or more keys 228 to the mobile device once the user 202 of the mobile device 204 has been authenticated and their authorization to access predetermined data stores has been determined.

In various embodiments, the one or more secret keys 228 are used by the location-based mobile device data protection system 150 acting as a privileged user (e.g., root) of the mobile device 204 at the time the authorized data store (e.g., data stores '1' 210 or '2' 212) is accessed. In these embodiments, the one or more secret keys 228 are only used by the location-based mobile device data protection system 150 in the mobile device's 204 memory 206 to decrypt the data stored in the data store (e.g., data stores '1' 210 and '2' 212) and make it accessible to the user 202. As an example, Linux Unified Key Setup (LUKS), in combination with md-crypt kernel module, is a common approach to encrypt a storage volume (e.g., data stores '1' 210 or '2' 212) and securely mount the storage volume with a shared key (e.g., secret key 22). Without the secret key 228, the storage volume may not be mounted and remains encrypted. Therefore, the contents may not be read. However, with access to the correct secret key 228, the storage volume is easily mounted and the contents may be freely read. In various embodiments, the one or more secret keys 228 are discarded after the authorized data store (e.g., data stores '1' 210 or '2' 212) is accessed.

In various embodiments, mobile device location monitoring operations are performed on an ongoing basis to determine whether the mobile device 204 has left 232, 236 its current geofence area (e.g., geofence 'A' 222 or 'B' 224). If so, the user 202 is prompted to close any open files. In certain embodiments, any storage volumes related to the protected data stores (e.g., data stores '1' 210 or '2' 212) are then locked and unmounted. In these embodiments, the method by which the volumes are locked and unmounted is a matter of design choice. In various embodiments, the mobile device 204 scans the system for open files (e.g., List of Open Files, or "lsof") and maps to associated applications and processes that own the file handles. In certain embodiments, the user 202 is prompted to save data before forced application shutdown in "n" minutes, where n=0, depending upon the implemented security policy 226. In various embodiments, the system (e.g., root account) kills processes holding open files to the secured storage volume (e.g., data stores '1' 210 or '2' 212).

In certain embodiments, the location-based mobile device data protection system 150 (e.g., root account) unmounts any storage volumes associated with the protected data stores (e.g., data stores '1' 210 or '2' 212). In these embodiments, the data is still intact after its associated volume is unmounted, however, it is not accessible and therefore unusable. More specifically, unmounting the volume outside of the geofence (e.g., geofence 'A' 222 or 'B' 224) prevents the data from being accessed until a secret key 228 can once again be retrieved and the storage volume remounted. Furthermore, the user 202 cannot remount and access the associated volume without the correct secret key 228. Moreover, the secret key 228 can only be retrieved if the mobile device 204 returns to an authorized geofence (e.g., geofence 'A' 222 or 'B' 224). In various embodiments, the authorized geofence (e.g., geofence 'B' 224) may not be the same geofence (e.g., geofence 'A' 222) previously departed 232, such as when the user is in transit between two authorized geofences (e.g., geofence 'A' 222 and 'B' 224). It will likewise be appreciated that the data stored in the encrypted data store (e.g., data stores '1' 210 or '2' 212), or associated storage volume, will be in the same state prior to it being locked, and in the case of a storage volume, unmounted.

In various embodiments, the preceding process steps are followed as described with mobile device management (MDM) or other security software running as root. In certain embodiments, the location-based mobile device data protection system 150 is running as root. In these embodiments, the user 202 is prevented from manually storing the one or more secret keys 228. In various embodiments, an occurrence of the mobile device 204 being compromised (e.g., rooted) is visible to the MDM or security software. For example, the user 202 may receive a notification on their mobile device 204 from Tivoli® Endpoint Manager® that their mobile device 204 is rooted. While the security policy 226 implemented for the user 202 may allow the rooted mobile device 204 to exist on its network 128, various embodiments of the invention would deny access to the rooted mobile device 204 because any associated secret key 228 could be compromised.

Those of skill in the art will likewise recognize that a reboot or shutdown of the mobile device 204 that is initiated as the user 202 exits 232, 236 the geographic boundary of a geofence (e.g., geofence 'A' 222 or 'B' 224) will not defeat the data protection provided by various embodiments of the invention, as the secret key 228 is not stored on the mobile device 204. Thus, a reboot would lose the mount point of a storage volume associated with data stores '1' 210 or '2' 212, because the secret key 228 does not exist on the mobile device 204 and it is not feasible to mount the encrypted volume without the key. Likewise, if the encrypted volume is forcibly unmounted as a result of the mobile device 204 being online when crossing a geofence boundary, it cannot be remounted because the secret key 228 is not present on the mobile device 204.

Figure 3:
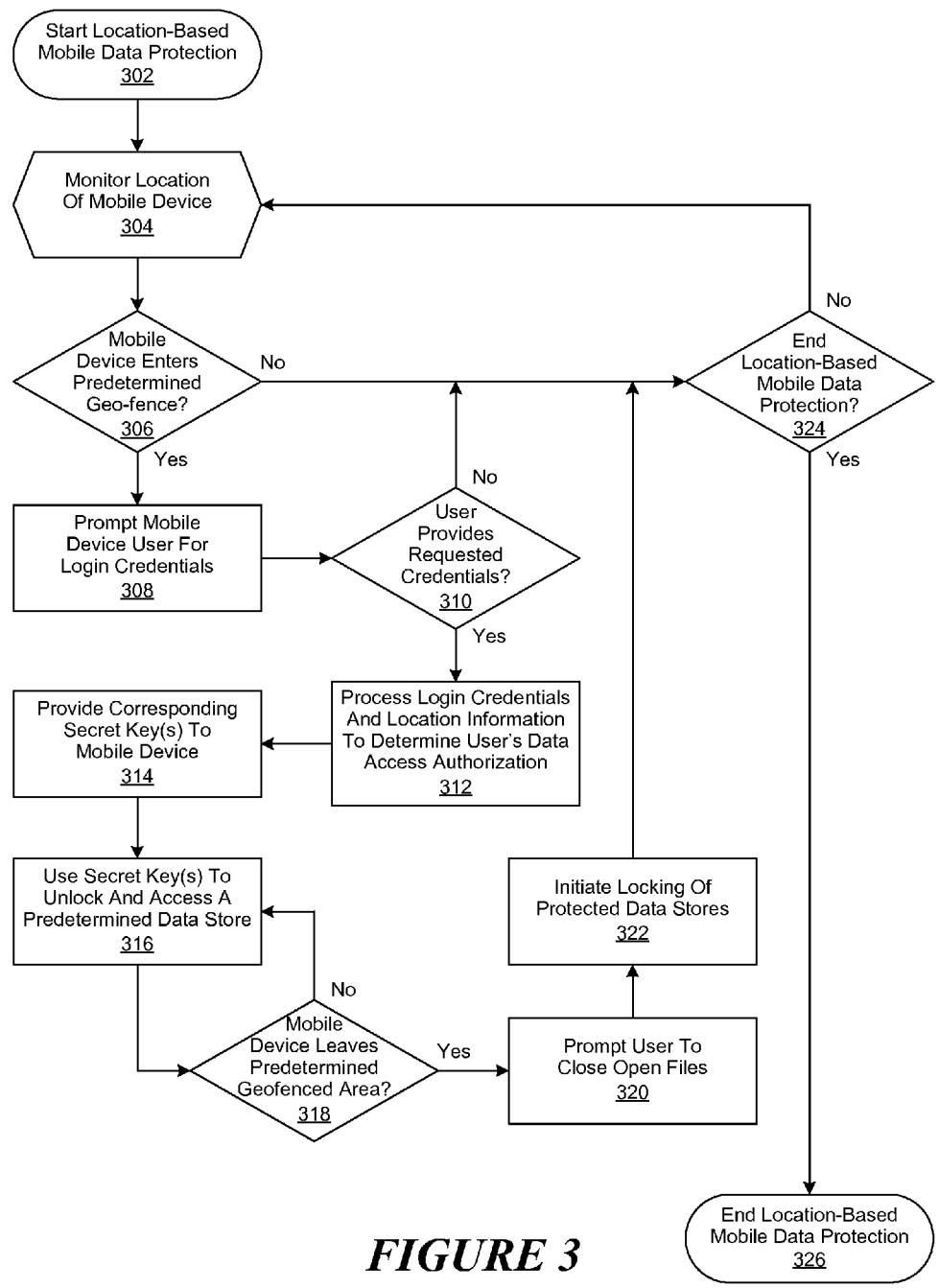
FIG. 3 is a generalized flowchart of the performance of location-based mobile device data protection operations.

FIG. 3 is a generalized flowchart of the performance of location-based mobile device data protection operations implemented in accordance with an embodiment of the invention. In this embodiment, location-based mobile device data protection operations are begun in step 302, followed by performing location monitoring operations in step 304 to monitor the location of a target mobile device. A determination is then made in step 306 whether the mobile device has entered a predetermined geofence.

If so, then the user of the mobile device is prompted to provide login credentials in step 308. If not, or if it is determined in step 306 that the mobile device has not entered a predetermined geofence, then a determination is made in step 324 whether to end location-based mobile device data protection operations. If not, then the process is continued, proceeding with step 302. Otherwise, location-based mobile device data protection operations are ended in step 326.

However, if it was determined in step 310 that the mobile device user provided login credentials, they are then processed in step 312 with various mobile device location information to authenticate the user of the mobile device and determine their authorization to access protected data stored in predetermined data stores. Once the mobile device user's authorization to access predetermined data is determined, one or more secret keys are provided to the mobile device in step 314, and then used in step 316 to unlock and access encrypted data stores corresponding to the user's authorization within their current geofence location. A determination is then made in step 318 whether the mobile device has left its current geofence area. If not, then the process is continued, proceeding with step 316. Otherwise, the user is prompted in step 320 to close any open files, followed by the locking of any related data stores in step 322. The process is then continued, proceeding with step 324.

Although the present invention has been described in detail, it should be understood that various changes, substitutions and alterations can be made hereto without departing from the spirit and scope of the invention as defined by the appended claims.

What is claimed is:

1. A computer-implemented method for protecting data stored on a mobile device, comprising:
   monitoring a location of a mobile device, the mobile device comprising an authorization engine, the authorization engine comprising a policy decision point, the mobile device comprising a first data store and a second data store;
   enabling access to data stored in the first data store of the mobile device when the mobile device is located in a first geographic area defined by a first geofence;
   preventing access to the data in the first data store when the mobile device is located outside of the first geographic area defined by the first geofence;
   enabling access to data stored in the second data store of the mobile device when the mobile device is located in a second geographic area defined by a second geofence;
   preventing access to the data in the second data store when the mobile device is located outside of the second geographic area defined by the second geofence; and
   responsive to detecting the mobile device is located outside the geographic area, automatically preventing access to the data store.

2. The method of claim 1, wherein:
   the preventing is provided by encrypting data on the mobile device utilizing a network stored key unknown to a user of the mobile device,
   access to the key is provided on a user authentication accessing a network when the mobile device is located within the geographic area; and
   the key is utilized to decrypt and provide access to a data store on the mobile device used to store the data.

3. The method of claim 2, wherein:
   the key is provided by a remote location-based mobile device data protection system and is not stored locally on the mobile device.

4. The method of claim 2, wherein:
   the key is discarded after the data store is accessed.

5. The method of claim 1, further comprising:
   responsive to detecting the mobile device is located outside the geographic area, terminating processes holding open files to the data store.

6. A system comprising:
   a processor;
   a data bus coupled to the processor; and
   a computer-usable medium embodying computer program code, the computer-usable medium being coupled to the data bus, the computer program code used for protecting data stored on a mobile device based on a location of the mobile device and comprising instructions executable by the processor and configured for:
   monitoring a location of a mobile device, the mobile device comprising an authorization engine, the authorization engine comprising a policy decision point, the mobile device comprising a first data store and a second data store;
   enabling access to data stored in the first data store of the mobile device when the mobile device is located in a first geographic area defined by a first geofence;
   preventing access to the data in the first data store when the mobile device is located outside of the first geographic area defined by the first geofence:
   enabling access to data stored in the second data store of the mobile device when the mobile device is located in a second geographic area defined by a second geofence;
   preventing access to the data in the second data store when the mobile device is located outside of the second geographic area defined by the second geofence; and
   responsive to detecting the mobile device is located outside the geographic area, automatically preventing access to the data store.

7. The system of claim 6, wherein:
   the preventing is provided by encrypting data on the mobile device utilizing a network stored key unknown to a user of the mobile device,
   access to the key is provided on a user authentication accessing a network when the mobile device is located within the geographic area; and
   the key is utilized to decrypt and provide access to a data store on the mobile device used to store the data.

8. The system of claim 7, wherein:
   the key is provided by a remote location-based mobile device data protection system and is not stored locally on the mobile device.

9. The system of claim 7, wherein:
   the key is discarded after the data store is accessed.

10. The system of claim 6, further comprising:
    responsive to detecting the mobile device is located outside the geographic area, terminating processes holding open files to the data store.

11. A non-transitory, computer-readable storage medium embodying computer program code, the computer program code comprising computer executable instructions configured for:
    monitoring a location of a mobile device, the mobile device comprising an authorization engine, the authorization engine comprising a policy decision point the mobile device comprising a first data store and a second data store: enabling access to data stored in the first data store of the mobile device when the mobile device is located in a first geographic area defined by a first geofence;
    preventing access to the data in the first data store when the mobile device is located outside of the first geographic area defined by the first geofence;
    enabling access to data stored in the second data store of the mobile device when the mobile device is located in a second geographic area defined by a second geofence;
    preventing access to the data in the second data store when the mobile device is located outside of the second geographic area defined by the second geofence; and
    responsive to detecting the mobile device is located outside the geographic area, automatically preventing access to the data store.

12. The non-transitory, computer-readable storage medium of claim 11, wherein:

the preventing is provided by encrypting data on the mobile device utilizing a network stored key unknown to a user of the mobile device, access to the key is provided on a user authentication accessing a network when the mobile device is located within the geographic area; and the key is utilized to decrypt and provide access to a data store on the mobile device used to store the data.

13. The non-transitory, computer-readable storage medium of claim 12, wherein:

the key is provided by a remote location-based mobile device data protection system and is not stored locally on the mobile device.

14. The non-transitory, computer-readable storage medium of claim 12, wherein:

the key is discarded after the data store is accessed.

15. The non-transitory, computer-readable storage medium of claim 11, wherein:

responsive to detecting the mobile device is located outside the geographic area, terminating processes holding open files to the data store.

16. The non-transitory, computer-readable storage medium of claim 11, wherein the computer executable instructions are deployable to a client system from a server system at a remote location.

17. The non-transitory, computer-readable storage medium of claim 11, wherein the computer executable instructions are provided by a service provider to a user on an on-demand basis.

* * * * *